Jan. 6, 1942.     J. O. DAVIS     2,268,808
RECORDING DEVICE
Filed Dec. 6, 1939

Inventor
Jack O. Davis
by Wilkinson & Mawhinney
Attorneys.

UNITED STATES PATENT OFFICE 2,268,808

RECORDING DEVICE

Jack Ostins Davis, Portland, England, assignor to Henry Hughes & Son, Limited, London, England, a corporation of Great Britain Application December 6, 1939, Serial No. 307,898

8 Claims. (Cl. 177—386)

This invention relates to recording apparatus and particularly to recorders used as part of apparatus for depth measurement by the echo reception method in which the interval between the transmission of a signal and the reception of its echo is used to give a measure of the depth from which the echo is received. The present invention is particularly concerned with recorders having a marking stylus which is made to travel round continuously in a circular path, a part of which crosses a record strip on which the stylus is caused to mark the instant of reception of the echo so that the distance of the mark from the zero point of a scale associated with the record strip is a measure of the recorded depth. The mechanism for rotating the stylus also provides for the actuation of contacts to control the transmission of the signal at the appropriate instant and provision is also made for driving the stylus round at different predetermined constant speeds to correspond with different scales of depth measurement.

Allowance may have to be made, when setting up the apparatus, for suitable corrections to be applied when changes in the stylus speed are made to ensure that the zero point of the scale of depth measurements is kept the same despite such speed changes, since any time lag in the apparatus and any allowance for the draft of a vessel into which the apparatus may be fitted is represented by a different fraction of the total scale for the different scales used.

One object of the present invention is to provide means whereby any necessary zero correction can be applied automatically when the speed of the stylus is changed and a further object is to provide means whereby the extent of the correction can be set precisely to any predetermined amount for each of the different stylus speeds.

It is usually convenient, in the case of echo-sounding apparatus, to provide a phasing arrangement, that is to say, provision for actuation of the contacts controlling the transmission of the sound signal, and the consequent transmission of the signal, in advance of the instant at which the stylus coincides with the zero point of the depth measurement scale. The transmission of the signal is advanced in steps corresponding with convenient known distances and the resulting effect is to enable the same scale of depth to be used for different ranges of depth measurements by allowing for the extent by which the signal transmission is advanced. When such phasing means are provided it is usually convenient for the zero correction to be incorporated with the phasing adjustments and, accordingly, a further object of the invention is to provide means whereby any required zero correction is applied to a locating pawl used to determine the settings of the phasing control.

Further objects and constructional details of an embodiment of the invention will be apparent from the accompanying drawing which illustrates one construction of zero correcting arrangement and a rotary stylus type of recorder with which the invention is incorporated.

The invention will be described in connection with a rotary stylus type of recorder having provision for changing the stylus speed to correspond with different depth scales and with phasing means as above described.

Figure 1:
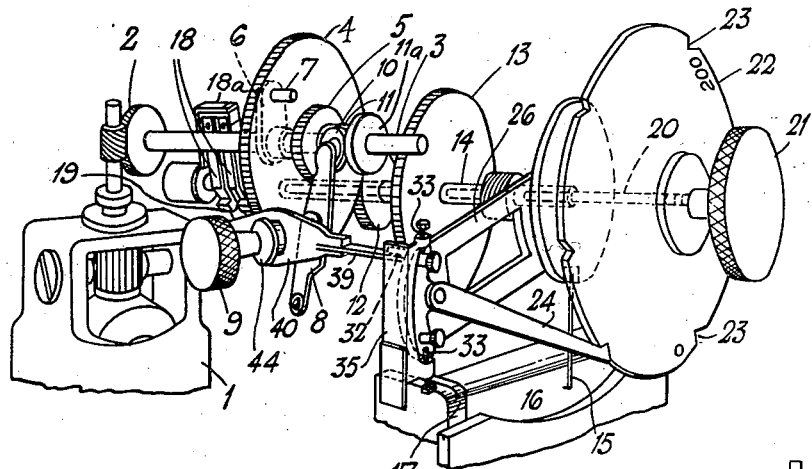
Fig. 1 is a diagrammatic perspective view of a construction of recorder incorporating the zero correcting device.
Figure 4:
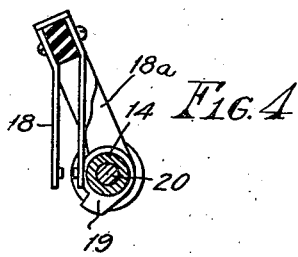
Fig. 4 is an end view partly in section and partly broken away of the switches and the switch-actuating cams.

Referring first to Fig. 1 this shows diagrammatically the parts of the recorder construction essential to an understanding of the invention and the recorder illustrated includes a driving motor 1 governed to run at constant speed and driving through worm gearing 2, a shaft 3 having thereon a pair of slidable gears 4, 5, driven from the shaft 3 by means of an arm 6 secured thereon and provided with a pin 7 projecting through the gear 4. The gears 4, 5 are movable along the shaft 3 by means of an arm 8 which can be swung by turning movement of an operating knob 9. The gears 4 and 5 are fixed to a sleeve 11 which slides on the shaft 3. The sleeve has a disk 11a on its end which defines, with the face of the gear 5, a groove for receiving the roller 10 on the end of the arm 8. Rocking movement of the arm 8 moves these gears so that the drive from shaft 3 is either through gear 4 and a smaller gear 12 or through gear 5 and a larger gear 13. The gears 12, 13 are secured on shaft 14 and form with gears 4, 5 a change speed gearing as is well known. The drive transmitted through the change speed gearing rotates the shaft 14 which carries on its forward end a disc with a projecting stylus 15 which thus moves round in a circular path and crosses a recording strip 16 during part of its travel. The record strip 16 is unwound from a roll (not shown) and is moved downwards over the supporting surface 17. The change speed gearing enables the stylus speed to be changed from one constant speed to another constant speed in accordance with different scales of measurement.

The transmission of a signal, when the recorder is used as part of echo sounding apparatus is controlled by contacts 18 engaged by cams 19 on the tubular shaft 14 which carries the stylus. The contacts 18 are mounted in a frame 18a which is fixed to a spindle 20 and can be moved round relatively to the stylus shaft 14 to adjust the making and breaking of the contacts relative to the position of the stylus 15. The spindle 20 projects through the tubular shaft 14 and carries the contacts 18 at its rear end. The spindle 20 is rotatable by an external knob 21. The rotation of the knob 21 thus enables phasing adjustments to be made, that is to say the transmission of a signal before the stylus starts to cross the record strip so as to allow for the recording of greater depths than could ordinarily be recorded during the time whilst the stylus is moving across the record strip 16.

The spindle has secured on its front end an indicating plate or dial 22 provided with notches 23 in its periphery which are engaged by a pawl 24 to locate the spindle 20 and contacts 18 in the proper angular positions to provide suitable phasing adjustments.

Figure 3:
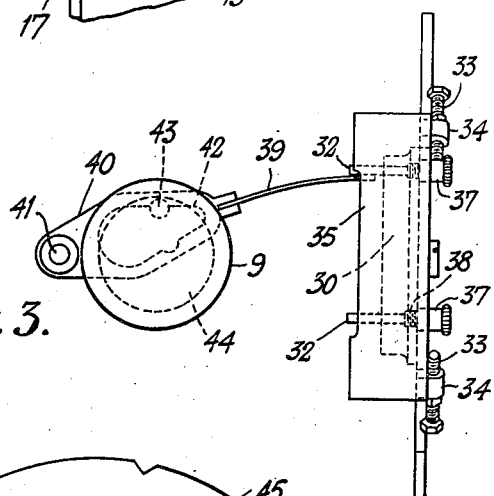
Fig. 3 is a side view of the parts shown in Fig. 2.
Figure 2:
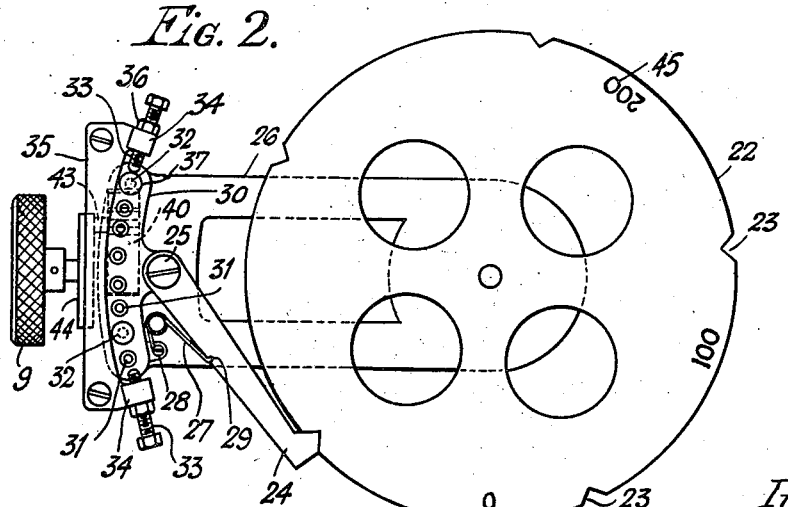
Fig. 2 is a front elevation to a larger scale of the zero correcting device.

The dial and pawl and its associated mechanism are shown to a larger scale in Figs. 2 and 3 and it will be seen that the pawl 24 is pivoted by a screw 25 to an elongated carrier plate 26 which is freely pivoted co-axially with the dial 22 and the spindle 20 and shaft 14. The pawl is pressed towards the periphery of the dial 22 by a suitable spring 27 fixed at one end by a screw 28 in the plate 26 and anchored at its other end in a notch 29 at the back of the pawl. The free end of the carrier plate 26 is formed with an arcuate head 30 provided with a plurality of sockets 31 located on a circular arc struck from the pivotal axis of the plate 26 and these sockets 31 are adapted to receive a pair of pins 32 which limit the swinging movement of the carrier plate by striking against adjustable stops consisting of screws 33 screwing through sockets 34 at the ends of a fixed block 35 secured to some fixed part of the recorder as shown in Fig. 1. The screws 33 are provided with lock nuts 36. The pins 32 are provided with enlarged heads 37 which engage the screwed stops 33 and the pins have screw threads 38 (Fig. 3), beneath their heads by which they are screwed into the socket holes 31. The reduced portions of the pins 32 are long enough to extend through the head 30 of the carrier arm and project at the back thereof as shown in Fig. 3. The rearwardly projecting portions of the pins 32 can be engaged by a spring strip 39 mounted at one end in a carrier 40 capable of swinging movement about a fixed pivot 41. The carrier has a hole 42 therethrough shaped as shown and into which projects a pin 43 on a disc 44 integral with the knob 9 for operating the change speed gear. In the position shown the spring strip 39 bears at its free end against the upper-most pin 32 and holds the latter against the upper screwed stop 33 so that the phasing adjustments are made by step by step movement of the dial 22 to bring the successive notches 23 into engagement with the locating pawl 24. The position of the pawl 24 is of course controlled by the adjustment of the upper screwed stop 33 and the position in which the associated pin 32 is secured in the holes in the carrier arm.

When a change in stylus speed is made by turning the knob 9 the pin 43 moves across the opening 42 in the carrier 40 which is swung about its pivot 41 to move the spring strip 39 from contact with the upper pin 32 into engagement with the lower pin 32 and the carrier arm 26 is thereby moved until the lower pin 32 engages the lower screwed stop 33. The arm 26 carries the pawl 24 with it in its movement and the pawl therefore rotates the phasing disc 22 slightly through a predetermined angle to compensate automatically for any change in the zero position resulting from a change in the speed of the stylus.

The new position of the pawl 24 can be controlled precisely by adjustment of the lower screwed stop 33 and the position of the lower pin 32 in the holes 31 in the head of the carrier arm and the pawl continues to act as a locater for the different angular positions of the phasing dial 22 so that each phasing adjustment has a zero correction automatically applied to it.

The phasing dial 22 is provided with suitable indications as at 45 to show the particular range of depth measurement in use at any time. The appropriate indication 45 is visible through a window or opening in the casing of the apparatus (not shown) and the indications consequently change as the dial 22 is stepped round.

What I claim as my invention and desire to secure by Letters Patent is:

1. In an echo-sounding recorder, a stylus, means providing a recording surface, a drive operable to effect relative cyclic movement between said stylus and said surface, signalling means including an actuatable element, actuating means operated by said drive to actuate said element in timed relation with respect to a predetermined point in said cyclic movement, means operable to change said drive from one constant speed to another constant speed, and means operatively associated with said last named means to effect a time correction relative to said predetermined point in the operating relation between said element and said actuating means when a change is made in the constant rate of speed of said drive.

2. In an echo-sounding recorder, a stylus, means providing a recording surface, a drive operable to effect relative cyclic movement between said stylus and said surface, signalling means including an actuatable element, actuating means operated by said drive to actuate said element in timed relation with respect to a predetermined point in said cyclic movement, means operable to change said drive from one constant speed to another constant speed, means including a depth range indicator manually movable to determine the timed relation between the actuation of said element and said predetermined point, and means operatively associated with said operable means to move said manually movable means to make a time correction in the actuation of said element relative to said predetermined point when a change is made in the speed of said drive.

3. In an echo-sounding recorder, a stylus, means providing a recording surface, a drive operable to effect relative cyclic movement between said stylus and said surface, signalling means including an actuatable element, actuating means operated by said drive to actuate said element in timed relation with respect to a predetermined point in said cyclic movement, means operable to change said drive from one constant speed to another constant speed, means manually movable to advance or retard relative to said predetermined point the operating relation between said element and said actuating means, means to releasably hold said manually movable means in a selected position, and means operatively associating said operable means with said releasable holding means to effect a time correction relative to said predetermined point in the operating relation between said element and said actuating means when a change is made in the constant rate of speed of said drive.

4. In an echo-sounding recorder, a stylus operable for movement through a predetermined cycle, a drive for the stylus, signalling means including an actuatable element, actuating means operated by said drive to actuate said element at a predetermined point in the cyclic movement of said stylus, means operable to change the drive to said stylus from one constant speed to another constant speed, and means operatively associated with said operable means to effect a time correction relative to said predetermined point in the operating relation between said element and said actuating means when a change is made in the constant rate of speed of said drive.

5. In an echo-sounding recorder, a stylus, a drive shaft operable to move the stylus through a predetermined cycle, signalling means including an actuatable element disposed adjacent said shaft, means carried by said shaft to actuate said element at a predetermined point in the cyclic movement of said stylus, means operable to change the movement of said shaft from one constant speed to another constant speed, and means operatively associated with said operable means to move said element relative to said shaft to make a time correction with respect to said predetermined point in the actuation of said element when a change is made in the constant rate of speed of said shaft.

6. In an echo-sounding recorder, a stylus, a drive shaft operable to move the stylus through a predetermined cycle, an actuatable element, means to manually adjust said element circumferentially about said drive shaft, means carried by said drive shaft to actuate said element, means operable to change the movement of said drive shaft from one constant speed to another constant speed, and means operatively associating said operable means with said manually adjustable means to effect adjustment of said element circumferentially of said drive shaft when a change is made in the constant speed of said drive shaft.

7. In an echo-sounding recorder, a stylus, a drive shaft operable to move the stylus through a predetermined cycle, an actuatable element, a dial having means to indicate the depth range for which the recorder is operating, a second shaft to support said element and said dial, means carried by said drive shaft to actuate said element, means operable to change the movement of said drive shaft from one constant speed to another constant speed, and means operatively associating said operable means with said second shaft to effect an angular adjustment of said element about said drive shaft and a corresponding movement of said dial when a change is made in the constant speed of said drive shaft.

8. In an echo-sounding recorder, a stylus, a drive shaft operable to move the stylus through a predetermined cycle, an actuatable element, a dial having means to indicate the depth range for which the recorder is operating, a second shaft to support said element and said dial, means carried by said drive shaft to actuate said element, means operable to change the movement of said drive shaft from one constant speed to another constant speed, said dial having a series of notches, means pivoted for movement about the axis of said second shaft, a pawl adjustably supported on said pivoted means adapted to engage said notches, and said pivoted means being operatively associated with said operable means to effect an angular adjustment of said element about said drive shaft and a corresponding movement of said dial when a change is made in the constant speed of said drive shaft.

JACK OSTINS DAVIS.